United States Patent
Kobayashi

(10) Patent No.: US 9,013,737 B2
(45) Date of Patent: Apr. 21, 2015

(54) IMAGE READING DEVICE AND NON-TRANSITORY COMPUTER READABLE MEDIUM STORING IMAGE READING CONTROL PROGRAM

(75) Inventor: Yujiro Kobayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 319 days.

(21) Appl. No.: 13/240,373

(22) Filed: Sep. 22, 2011

(65) Prior Publication Data

US 2012/0250079 A1    Oct. 4, 2012

(30) Foreign Application Priority Data

Mar. 28, 2011  (JP) ................... 2011-070284

(51) Int. Cl.
*G06F 3/12*    (2006.01)
*H04N 1/00*    (2006.01)
*G06K 15/00*   (2006.01)

(52) U.S. Cl.
CPC ....... *H04N 1/00411* (2013.01); *H04N 1/00424* (2013.01); *H04N 1/0048* (2013.01); *H04N 1/00925* (2013.01); *H04N 2201/0075* (2013.01); *H04N 2201/0098* (2013.01); *H04N 2201/0094* (2013.01)

(58) Field of Classification Search
CPC .................. H04N 1/00925; H04N 2201/0075; H04N 2201/0098; H04N 1/00411; H04N 1/00413; H04N 1/0048
See application file for complete search history.

(56) References Cited

U.S. PATENT DOCUMENTS

2007/0153320 A1 *  7/2007  Yamaoka ............ 358/1.15
2010/0315675 A1 * 12/2010  Yagi ..................... 358/1.15

FOREIGN PATENT DOCUMENTS

| JP | 2004-215009 A | | 7/2004 |
| JP | 2006217103 A | * | 8/2006 |
| JP | 2008-193528 A | | 8/2008 |

* cited by examiner

*Primary Examiner* — Thierry L Pham
(74) *Attorney, Agent, or Firm* — Sughrue Mion, PLLC

(57) ABSTRACT

An image reading device includes: a reading unit that reads image data of a document; a communication unit that communicates with an external apparatus; a start unit that receives a start instruction transmitted from the outside through the communication unit and starts the reading unit; a display; a first screen display unit that displays a first screen on the display before the reading unit starts; a second screen display unit that displays a second screen on the display after the reading unit reads the image data; a start instruction receiving unit that enables the start unit to receive the start instruction during the display of the first screen; and an inhibition unit that inhibits a process which involves a screen change and is not related to a process of reading the image data, while the first screen is displayed.

26 Claims, 9 Drawing Sheets

IMAGE READING DEVICE AND NON-TRANSITORY COMPUTER READABLE MEDIUM STORING IMAGE READING CONTROL PROGRAM

CROSS-REFERENCE TO RELATED APPLICATIONS

This application is based on and claims priority under USC 119 from Japanese Patent Application No. 2011-070284 filed Mar. 28, 2011.

BACKGROUND (i) Technical Field

The present invention relates to an image reading device and a non-transitory computer readable medium storing an image reading control program.

(ii) Related Art

Some multi-function printers (hereinafter, referred to as "MFPs") have a pull scan (also referred to as remote scan) function. The user who uses the MFP to perform pull scanning places a document on an automatic feeder or a platen of the MFP, moves from the front side of the MFP to a remote terminal connected to the MFP, and operates the remote terminal to start the MFP, thereby starting an image data reading process. In addition, the user who uses the MFP to send a facsimile places a document on the automatic feeder or the platen of the MFP and directly operates an operation button of the MFP to start the MFP, thereby starting an image data reading process.

SUMMARY

According to an aspect of the invention, there is provided an image reading device including: a reading unit that reads image data of a document placed on a platen; a communication unit that communicates with an external apparatus; a start unit that receives a start instruction transmitted from the outside through the communication unit and starts the reading unit; a display unit that displays a screen; a first screen display unit that displays a first screen on the display unit before the reading unit starts; a second screen display unit that displays a second screen on the display unit after the reading unit reads the image data; a start instruction receiving unit that enables the start unit to receive the start instruction during the display of the first screen; and an inhibition unit that inhibits a process which involves a screen change and is not related to a process of reading the image data, while the first screen is displayed.

BRIEF DESCRIPTION OF THE DRAWINGS

Exemplary embodiment(s) of the present invention will be described in detail based on the following figures, wherein.

DETAILED DESCRIPTION

Hereinafter, an image reading device and an image reading control program according to exemplary embodiments of the invention will be described with reference to the accompanying drawings.

[Structure of Pull Scan System]

Figure 1:
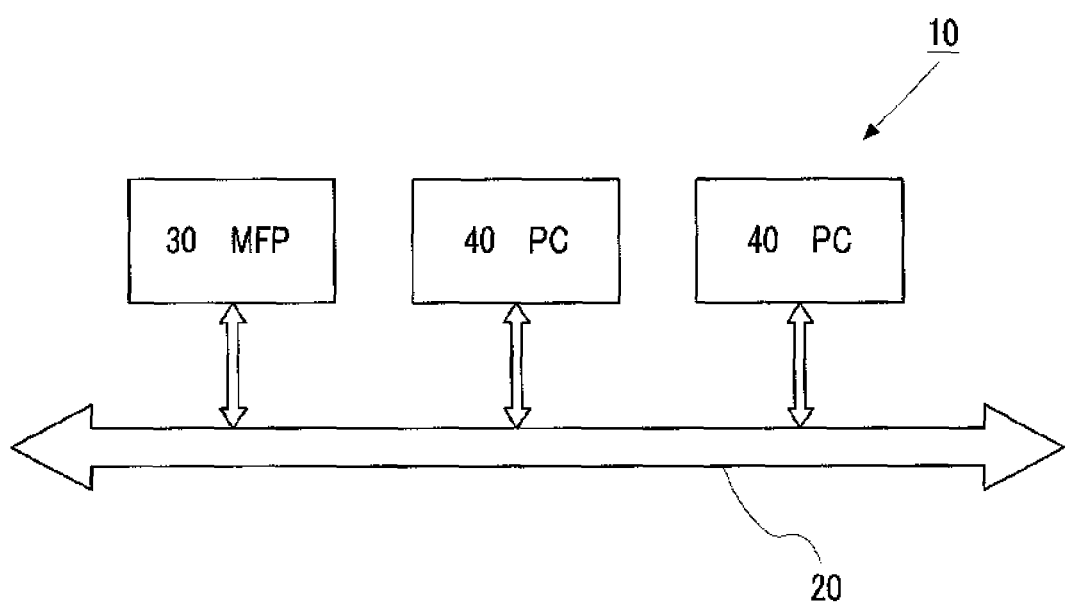
FIG. 1 is a diagram illustrating the structure of a pull scan system.

FIG. 1 is a diagram illustrating the structure of a pull scan system.

A pull scan system 10 includes a communication line 20, an MFP 30 connected to the communication line 20, and one or more personal computers (hereinafter, referred to as "PCs") 40. The MFP 30 and the PCs 40 may communicate with each other through the communication line 20 and the PCs 40 may communicate with each other through the communication line 20. The communication line 20 is connected to a telephone line or an Internet line.

[Structure of MFP]

Figure 2:
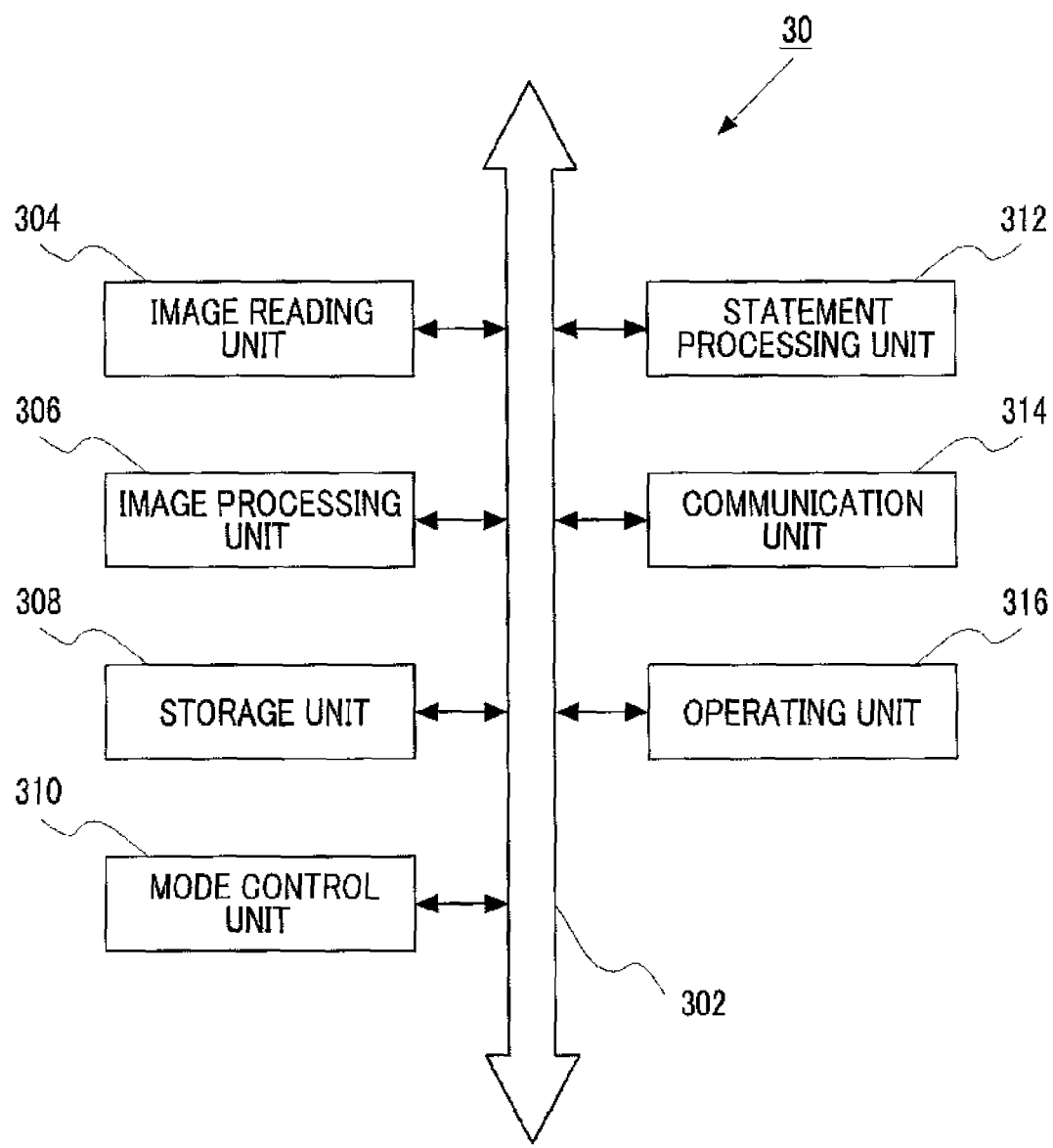
FIG. 2 is a block diagram illustrating the structure of an MFP.

FIG. 2 is a block diagram illustrating the structure of the MFP.

The MFP 30 includes an image reading unit 304, an image processing unit 306, a storage unit 308, a mode control unit 310, a statement processing unit 312, a communication unit 314, and an operating unit 316 which are connected to each other through a signal line 302.

The image reading unit 304 scans a document placed on a platen. The image processing unit 306 processes the image of the document scanned by the image reading unit 304 into image data. The storage unit 308 stores the image data converted by the image processing unit 306.

The mode control unit 310 controls the operation mode of the MFP 30 in response to a mode change instruction. In this exemplary embodiment, it is assumed that at least three operation modes, such as a "normal mode", a "pull scan standby mode", and a "document removal confirmation mode", are set to the MFP 30.

The statement processing unit 312 controls the overall operation of the MFP 30. For example, the statement processing unit 312 controls each unit of the MFP 30 in order to perform processes corresponding to various kinds of instructions which are received from the outside through the communication unit 314 or the operating unit 316, which will be described below.

The communication unit 314 is an interface for transmitting or receiving information to or from an external apparatus and communicates with a terminal (in this exemplary embodiment, the PC 40) connected to the communication line 20 shown in FIG. 1. The operating unit 316 is a man-machine interface for transmitting or receiving information to or from the user and includes, for example, a screen for providing the information of the MFP 30 to the user and buttons used by the user to input information to the MFP 30. Specifically, the operating unit 316 includes a touch panel, a display, or operation buttons.

[Functions of MFP]

Figure 3:
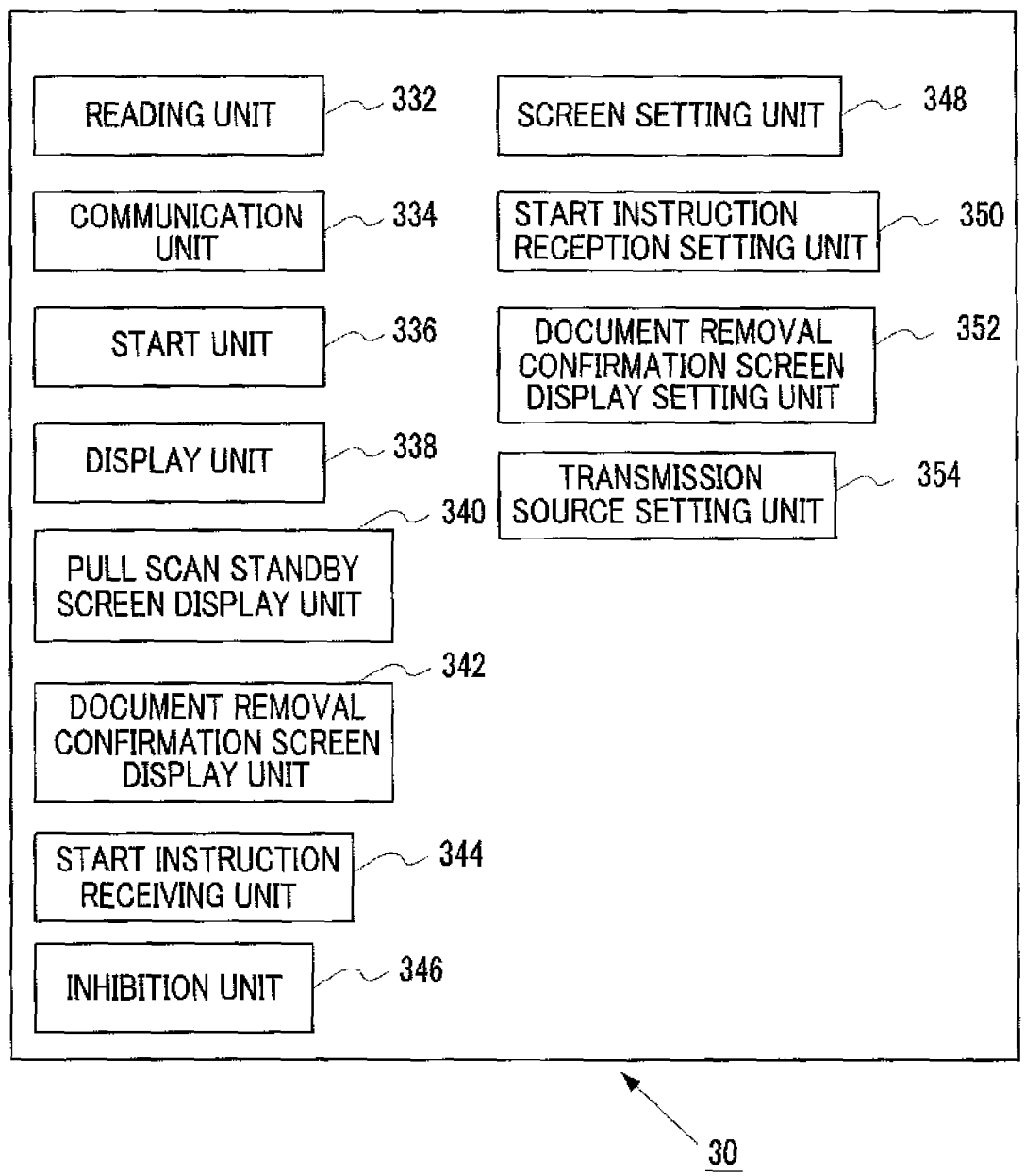
FIG. 3 is a block diagram illustrating functions according to an exemplary embodiment.
Figure 4:
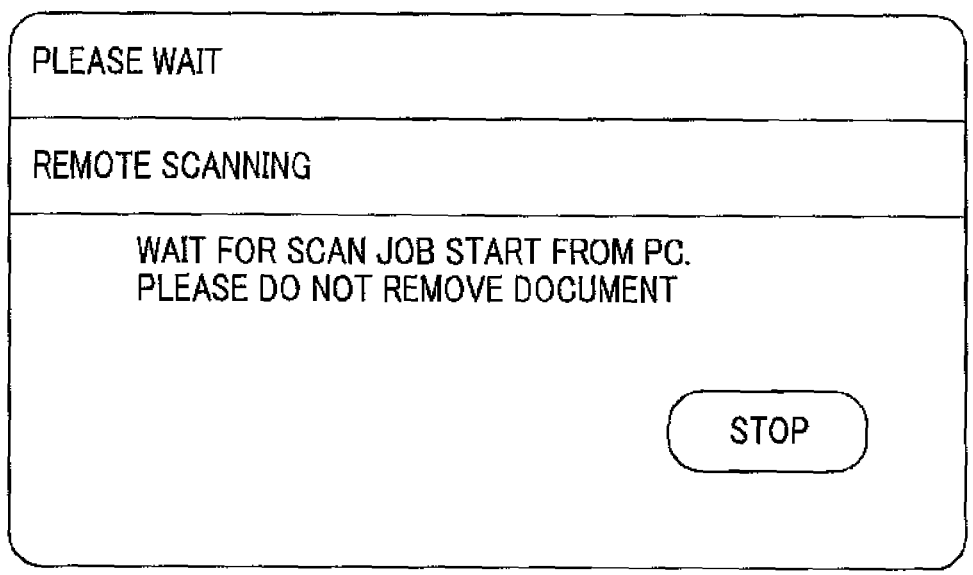
FIG. 4 is a diagram illustrating the structure of a pull scan standby screen.
Figure 5:
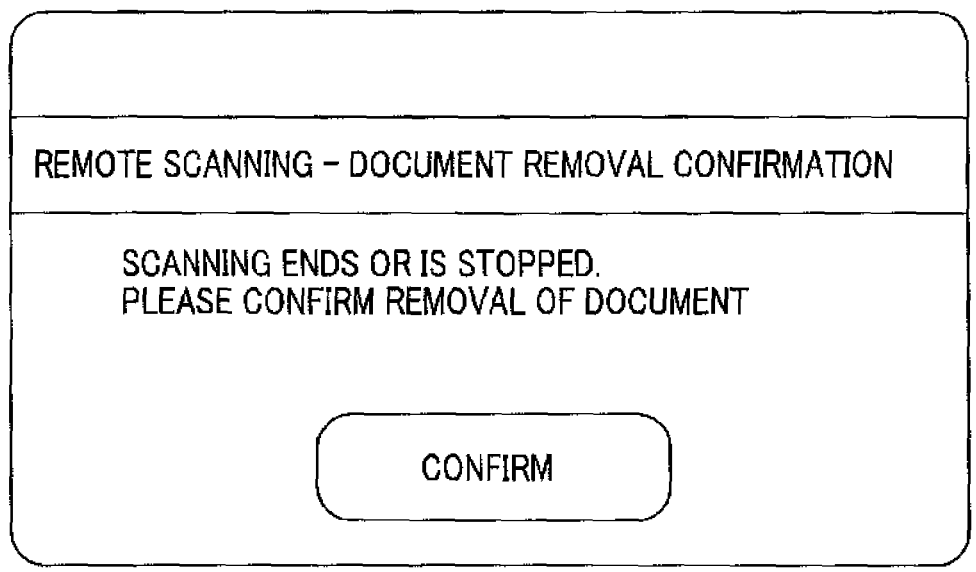
FIG. 5 is a diagram illustrating a document removal confirmation screen.

FIG. 3 is a block diagram illustrating the functions of the exemplary embodiment. FIG. 4 is a diagram illustrating the structure of a pull scan standby screen. FIG. 5 is a diagram illustrating the structure of a document removal confirmation screen.

In this exemplary embodiment, the basic functions of the MFP 30 related to pull scanning are implemented by a reading unit 332, a communication unit 334, a start unit 336, a display unit 338, a pull scan standby screen display unit 340, a document removal confirmation screen display unit 342, a start instruction receiving unit 344, and an inhibition unit 346 shown in FIG. 3. The following functions are implemented by each component shown in FIG. 2. However, the following functions may be implemented by other components.

The reading unit 332 reads image data of the document placed on the platen. The communication unit 334 communicates with an external apparatus. The start unit 336 receives a start instruction transmitted from the outside through the communication unit 334 and starts the operation of the reading unit 332. The display unit 338 displays a screen. The pull scan standby screen display unit 340 displays the pull scan standby screen shown in FIG. 4 on the display unit 338 before the reading unit 332 starts. The document removal confirmation screen display unit 342 displays the document removal confirmation screen shown in FIG. 5 on the display unit 338 after the reading unit 332 reads the image data. The start instruction receiving unit 344 enables the start unit 336 to receive the start instruction during the display of the pull scan standby screen. The inhibition unit 346 inhibits a process that involves a screen change and is not related to the process of reading image data during the display of the pull scan standby screen. The inhibition unit 346 may inhibit the process that involves a screen change and is not related to the process of reading image data during the display of the pull scan standby screen and during the display of the document removal confirmation screen.

Additional functions are implemented by a screen setting unit 348, a start instruction reception setting unit 350, a document removal confirmation screen display setting unit 352, and a transmission source setting unit 354 shown in FIG. 3. The screen setting unit 348 sets whether to display the document removal confirmation screen on the display unit 338 or to display the pull scan standby screen on the display unit 338 again after the process of reading the image data. The start instruction reception setting unit 350 sets whether to enable the start unit 336 to receive the start instruction only during the display of the pull scan standby screen or to enable the start unit 336 to receive the start instruction both when the pull scan standby screen is displayed and when the pull scan standby screen is not displayed. When the start instruction reception setting unit 350 sets to enable the start unit 336 to receive the start instruction even when the pull scan standby screen is not displayed, the pull scan standby screen display unit 340 and the document removal confirmation screen display unit 352 do not perform display. The document removal confirmation screen display setting unit 352 sets whether to display the document removal confirmation screen or not. The transmission source setting unit 354 sets a start instruction transmission source. In this case, the start instruction receiving unit 344 receives only the start instruction from the transmission source set by the transmission source setting unit 354.

[Flow of Each Process]

Figure 6:
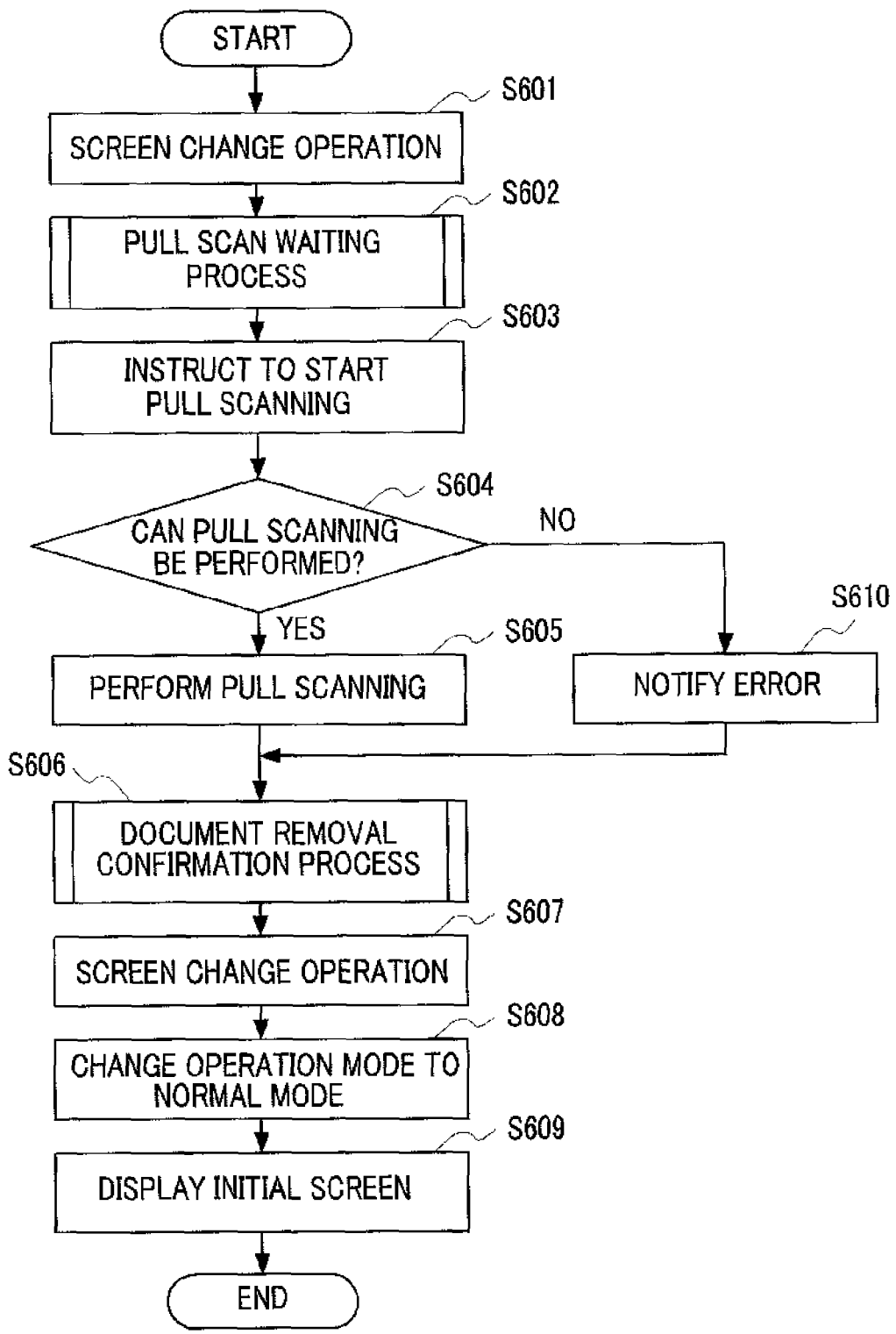
FIG. 6 is a flowchart illustrating a process according to this exemplary embodiment.

FIG. 6 is a flowchart illustrating a process according to this exemplary embodiment.

Next, a basic process according to this exemplary embodiment will be described with reference to FIGS. 2 and 6.

The user who performs pull scanning sets a document on the platen of the MFP 30 and performs a screen change operation of displaying the pull scan standby screen on the operating unit 316 (Step S601). Then, the MFP 30 performs a pull scan waiting process shown in FIG. 7 (Step S602). The pull scan waiting process will be described below. As a result of the pull scan waiting process, the mode control unit 310 changes the operation mode to the pull scan standby mode and the screen of the operating unit 316 is changed to the pull scan standby screen.

The user moves from the position where the MFP 30 is installed to the position where a remote terminal, that is, the PC 40 shown in FIG. 1 is installed, uses the PC 40 to designate the MFP 30, and inputs a pull scan start instruction. Then, the statement processing unit 312 receives the pull scan start instruction through the communication line 20 and the communication unit 314 (Step S603). The statement processing unit 312 acquires operation mode information from the mode control unit 310 and determines whether a pull scan is executable on the basis of the mode information, the state of the MFP 30, and the content of the start instruction (Step S604).

When the operation mode is the pull scan standby mode and the state of the MFP 30 and the content of the start instruction are normal (Yes in Step S604), the statement processing unit 312 determines that pull scanning is executable, receives the pull scan start instruction, and starts a pull scan job (Step S605). The image reading unit 304 reads the image of the document. The image processing unit 306 processes the image read by the image reading unit 304 into image data. The storage unit 308 stores the image data processed by the image processing unit 306. The image data is transmitted to the PC 40 through the communication unit 314 and the communication line 20.

Figure 8:
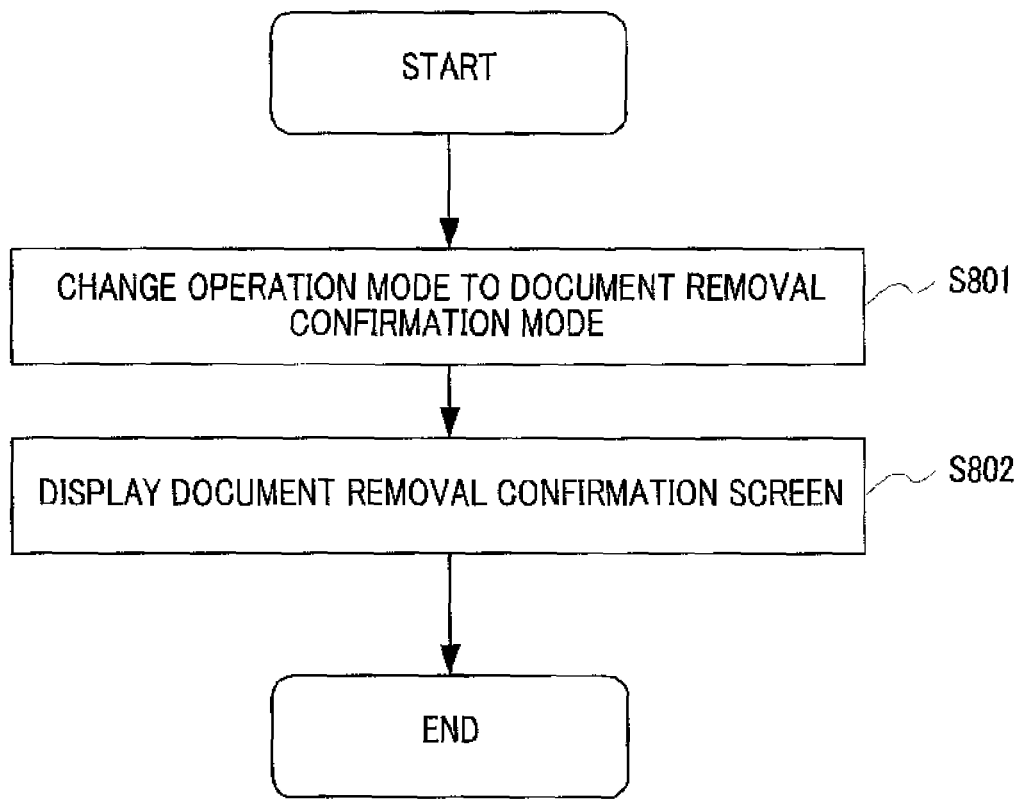
FIG. 8 is a flowchart illustrating a document removal confirmation process.

When the pull scan job ends, the MFP 30 performs a document removal confirmation process shown in FIG. 8 (Step S606). The document removal confirmation process will be described below. As a result of the document removal confirmation process, the operation mode of the mode control unit 310 is changed to the document removal confirmation mode and the screen of the operating unit 316 is changed to the document removal confirmation screen.

After the pull scanning, the user removes the document from the platen of the MFP 30 and performs a screen change operation of closing the document removal confirmation screen of the operating unit 316 (Step S607). Then, the statement processing unit 312 outputs a mode change instruction to the mode control unit 310 and the mode control unit 310 changes the operation mode to the normal mode or other service modes in response to the instruction (Step S608). In addition, the screen of the operating unit 316 is changed to the initial screen or other service screens (Step S609).

When the state of the MFP 30 or the content of the start instruction is not normal in Step S604 in which it is determined whether pull scanning is executable (NO in Step S604), the statement processing unit 312 determines that pull scanning is unavailable and transmits an error signal to the PC 40 through the communication unit 314 and the communication line 20, without receiving the pull scan start instruction (Step S610). Then, the process proceeds to the document removal confirmation process and the screen of the operating unit 316 is changed to the document removal confirmation screen (Step S606).

Although not shown in FIG. 6, in this exemplary embodiment, when the pull scan job is cancelled by the user or abnormally ends, the screen of the operating unit 316 is changed to a screen for stopping the job and is then changed to the document removal confirmation screen.

FIG. 6 shows the process of the MFP 30 receiving the pull scan start instruction in Step S603 after the operation mode is changed to the pull scan standby mode in Step S602. In some cases, when the MFP 30 is not in the pull scan standby mode, it receives the pull scan start instruction. For example, when the operation mode is not changed to the pull scan standby mode or the screen change operation in Step 601 is not changed for some reasons, the operation mode of the MFP 30 is not changed to the pull scan standby mode. When the MFP 30 is not in the pull scan standby mode and receives the pull scan start instruction, it transmits an error signal to the PC 40 through the communication unit 314 and the communication line 20, and ends the process.

Next, the pull scan waiting process in Step S602 shown in FIG. 6 will be described with reference to FIG. 7.

Figure 7:
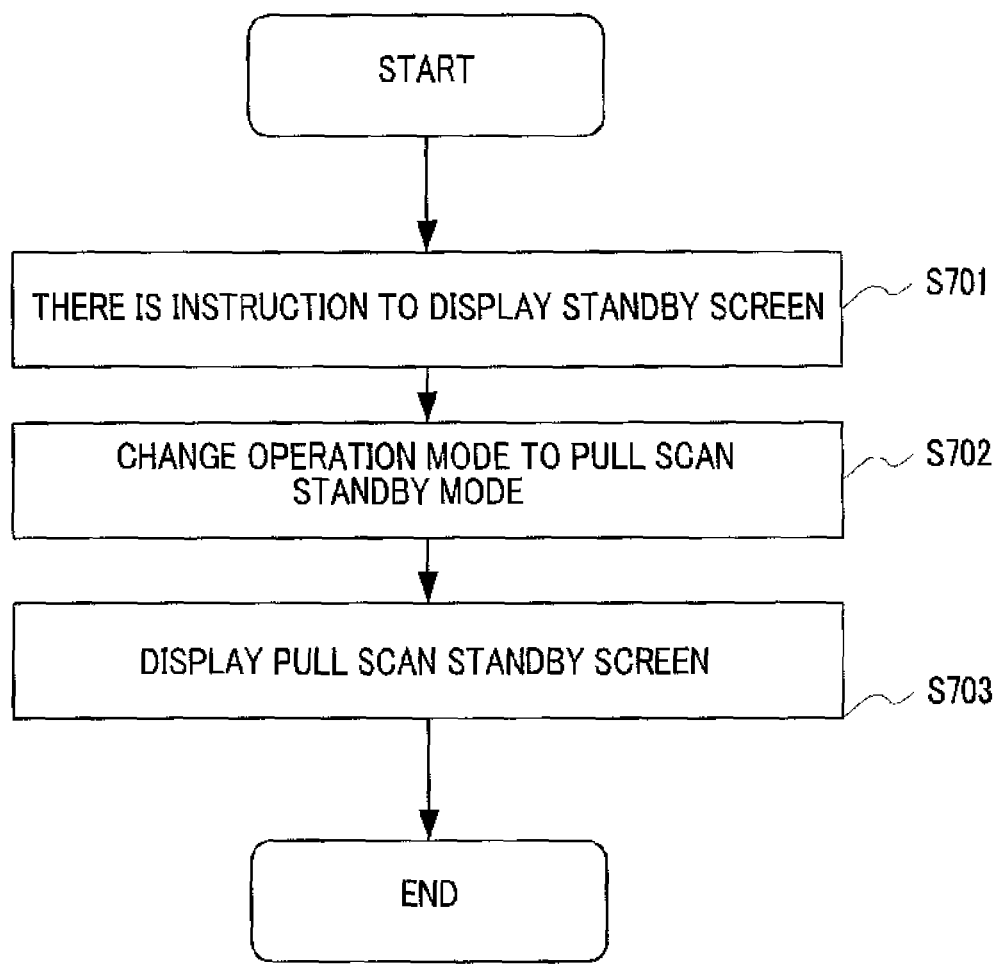
FIG. 7 is a flowchart illustrating a pull scan waiting process.

FIG. 7 is a flowchart illustrating the pull scan waiting process.

When the user performs an operation of displaying the pull scan standby screen using the operating unit 316, the statement processing unit 312 confirms a pull scan standby screen display instruction (Step S701). Then, the statement processing unit 312 outputs a mode change instruction to the mode control unit 310 and the mode control unit 310 changes the operation mode from the normal mode to the pull scan standby mode in response to the instruction (Step S702). In addition, the screen of the operating unit 316 is changed to the pull scan standby screen shown in FIG. 4 (Step S703). A message warning other users of the MFP 3C not to perform a process which change a document, such as a facsimile, is displayed on the pull scan standby screen.

Next, the document removal confirmation process in Step S606 shown in FIG. 6 will be described with reference to FIG. 8.

FIG. 8 is a flowchart illustrating the document removal confirmation process.

When the pull scan job ends, the statement processing unit 312 outputs a mode change instruction to the mode control unit 310. Then, the mode control unit 310 changes the operation mode from the pull scan standby mode to the document removal confirmation mode in response to the instruction (Step S801).

In addition, the statement processing unit 312 instructs the operating unit 316 to change the screen to the document removal confirmation screen. The screen of the operating unit 316 is changed to the document removal confirmation screen shown in FIG. 5 (Step S802). A message warning the user who has performed the pull scanning using the MFP 30 and other users that the document will remain on the platen and users must be careful not to misappropriate the document is displayed on the document removal confirmation screen.

Although not shown in FIG. 6, in this exemplary embodiment, during the display of the pull scan standby screen, a screen change inhibition process is performed such that the screen is not changed to screens other than the screen related to pull scanning and a processing involving the screen change is not performed. Examples of the process involving the screen change include a screen reset timer, a power saving process, a job interruption, a remote operation, and shortcuts to other service screens. The screen change inhibition process will be described with reference to FIG. 9.

Figure 9:
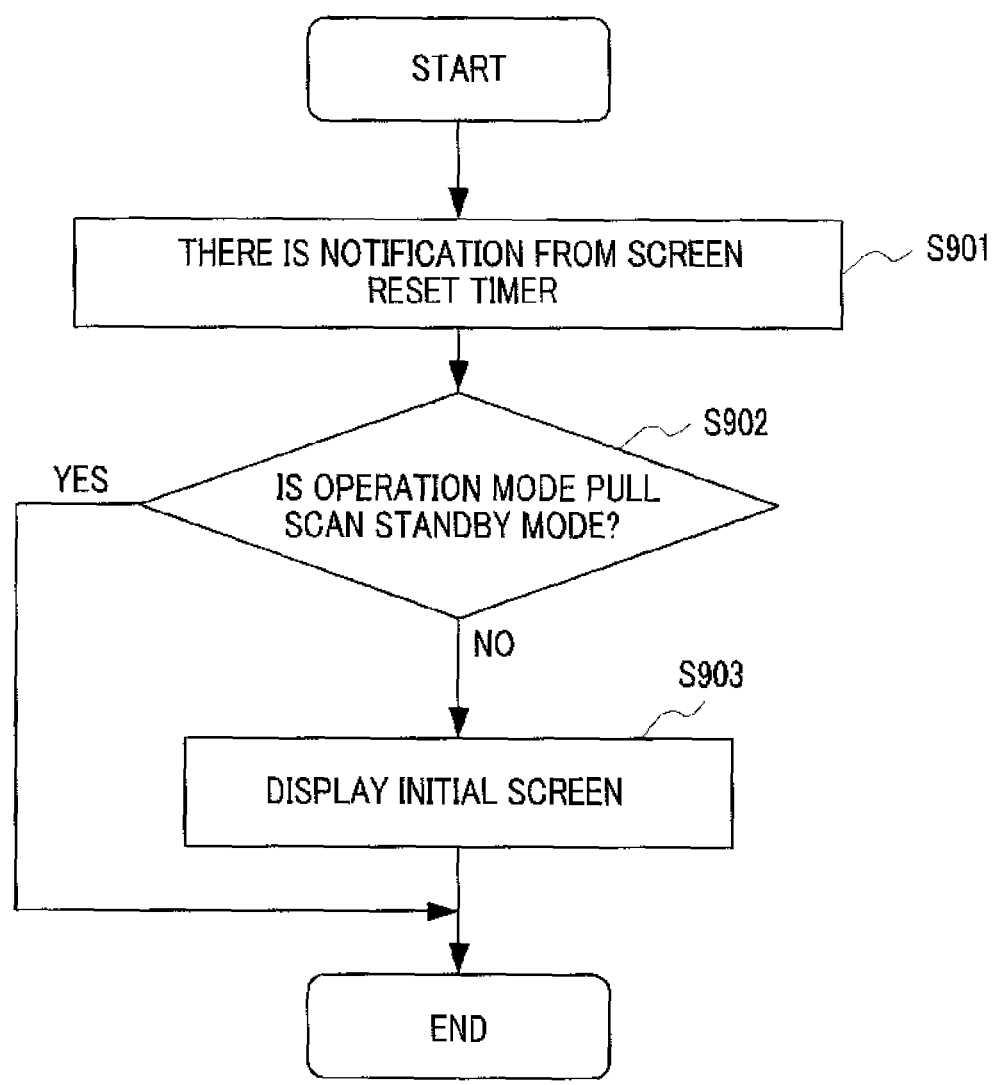
FIG. 9 is a flowchart illustrating a screen change inhibition process.

FIG. 9 is a flowchart illustrating the screen change inhibition process. FIG. 9 shows an example of a process of determining whether to inhibit a screen reset timer. The screen reset timer process changes the screen of the operating unit 316 to the initial screen when a predetermined period of time has elapsed.

When detecting a notice from the screen reset timer (Step S901), the statement processing unit 312 determines whether the pull scan standby screen is being displayed, that is, whether the operation mode of the mode control unit 310 is the pull scan standby mode (Step S902).

When the pull scan standby screen is being displayed, that is, when the operation mode is the pull scan standby mode, the process ends (YES in Step S902). In this case, the pull scan standby screen of the operating unit 316 is maintained.

On the other hand, when the pull scan standby screen is not displayed, that is, when the operation mode is not the pull scan standby mode, the statement processing unit 312 outputs a mode change instruction to the mode control unit 310 and the mode control unit 310 changes the operation mode to the normal mode in response to the instruction (NO in Step S902 and Step S903). In addition, the screen of the operating unit 316 is changed to the initial screen (Step S904).

According to this exemplary embodiment, until the user removes the document from the MFP, the pull scan standby screen shown in FIG. 4 or the document removal confirmation screen shown in FIG. 5 is displayed on the MFP. Therefore, other users will recognize that there is a document for pull scanning in the MFP. Therefore, misappropriation of the document is prevented.

During the display of the pull scan standby screen, the screen change inhibition process is performed such that the screen is not changed to screens other than the screen related to pull scanning and a process involving a screen change is not performed. Therefore, it is possible to reliably continue to display the pull scan standby screen until the pull scan process ends.

[Modifications]

Next, modifications of the above-described exemplary embodiment will be described.

A document removal confirmation flag may be used to determine whether to display the document removal confirmation screen. A document removal confirmation flag is turned on in response to an operation of displaying the pull scan standby screen. When a process involving a screen change is generated and the flag is turned on, the screen is changed to the document removal confirmation screen. When the document removal confirmation screen is closed, the flag may be turned off and the screen may be changed to a screen for the generated process.

In the above-described exemplary embodiment, during the display of the pull scan standby screen, a change to the screens other than the screen related to pull scanning is inhibited and the process involving the screen change is inhibited. However, during the display of the document removal confirmation screen, the change to the screens other than the screen related to pull scanning may be inhibited and the process involving the screen change may be inhibited.

In the above-described exemplary embodiment, after the pull scan job ends, the document removal confirmation screen is automatically displayed. However, there is a pull scan system according to an exemplary embodiment in which a document for pull scanning is checked on the screen of the PC, reading settings, such as resolution, are changed in the PC, and pull scanning is performed again. In this exemplary embodiment, when the document removal confirmation screen is automatically displayed after the pull scan job ends, as in the above-described exemplary embodiment, the user needs to move to the position where the MFP is installed and perform an operation of displaying the pull scan standby screen in each pull scanning process, which is complicated. Therefore, during the operation of displaying the pull scan standby screen, after the pull scan job ends, display may be set such that the pull scan standby screen, not the document removal confirmation screen, is displayed again. For example, this setting may be performed by the operating unit shown in FIG. 2.

In the above-described exemplary embodiment, pull scanning is executable only during the display of the pull scan standby screen. However, the user may select whether to enable pull scanning to be executable only when the pull scan standby screen is displayed or to enable pull scanning to be executable both when the pull scan standby screen is displayed and when the pull scan standby screen is not displayed. For example, the operating unit shown in FIG. 2 may be used to perform the selection operation.

In the above-described exemplary embodiment, after the pull scan job ends, the document removal confirmation screen is automatically displayed. However, after the pull scan job ends, the user may select whether to display the document removal confirmation screen or not. For example, the operating unit shown in FIG. 2 may be used to perform the selection.

In addition to the above-described exemplary embodiment, before the pull scan standby screen is displayed, the PC that outputs the start instruction may be set. For example, the user registers a list of target PCs in the MFP and designates a target PC from the list when the pull scan standby screen is displayed. When the user uses the PC to output a null scan start instruction, the MFP checks the address of the PC that outputs the start instruction and the address of the designated PC. When the addresses are identical to each other, it is determined whether pull scanning is executable (Step S604 in FIG. 6). A list of target PCs may not be registered in the MFP, and the user may input the address of the PC or the user may browse neighboring PCs connected to a network and select one of the PCs.

In the invention, each function shown in FIG. 3 may be performed by a program. A program to be installed in the MFP may be recorded on a recording medium (for example, a CD-ROM, a DVD-ROM, or a USB memory).

The invention is not limited to the MFP, but may be applied to an image reading device capable of performing pull scanning and an image reading control program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a reading unit configured to read image data of a document placed on a platen;
   a communication unit configured to communicate with an external apparatus;
   an input unit configured to input a user instruction from a user located at the input unit;
   a start unit configured to receive a start instruction transmitted from the outside through the communication unit and start the reading unit;
   a display unit configured to display a screen;
   a first screen display unit configured to display a first screen in response to receiving the user instruction, wherein the first screen is displayed while waiting for the start instruction;
   an inhibition unit configured to inhibit an operation other than a scan process initiated according to the start instruction while the first screen is displayed; and
   wherein the start unit is configured to receive the start instruction while the display unit displays the first screen.

2. The image reading device according to claim 1, wherein the inhibition unit is configured to inhibit any process which involves a screen change and is not related to the scan process, while the first screen is displayed.

3. The image reading device according to claim 1, further comprising:
   a second screen display unit configured to display a second screen on the display unit after the scan process; and
   a screen setting unit configured to set whether to display the second screen on the display unit or to redisplay the first screen on the display unit after the scan process.

4. The image reading device according to claim 2, further comprising:
   a second screen display unit configured to display a second screen on the display unit after the scan process; and
   a screen setting unit configured to set whether to display the second screen on the display unit or to redisplay the first screen on the display unit after the scan process.

5. The image reading device according to claim 1, further comprising:
   a start instruction reception setting unit configured to set whether to enable the start unit to receive the start instruction only while the first screen is displayed or to enable the start unit to receive the start instruction both while the first screen is displayed and while the first screen is not displayed.

6. The image reading device according to claim 2, further comprising:
   a start instruction reception setting unit configured to set whether to enable the start unit to receive the start instruction only while the first screen is displayed or to enable the start unit to receive the start instruction both while the first screen is displayed and while the first screen is not displayed.

7. The image reading device according to claim 3, further comprising:
   a start instruction reception setting unit configured to set whether to enable the start unit to receive the start instruction only while the first screen is displayed or to enable the start unit to receive the start instruction both while the first screen is displayed and while the first screen is not displayed.

8. The image reading device according to claim 4, further comprising:
   a start instruction reception setting unit configured to set whether to enable the start unit to receive the start instruction only while the first screen is displayed or to enable the start unit to receive the start instruction both while the first screen is displayed and while the first screen is not displayed.

9. The image reading device according to claim 1, further comprising:
   a second screen display unit configured to display a second screen on the display unit after the scan process; and
   a second screen display setting unit configured to set whether to display the second screen or not.

10. The image reading device according to claim 2, further comprising:
    a second screen display unit configured to display a second screen on the display unit after the scan process; and a second screen display setting unit configured to set whether to display the second screen or not.

11. The image reading device according to claim 3, further comprising:
a second screen display unit configured to display a second screen on the display unit after the scan process; and
a second screen display setting unit configured to set whether to display the second screen or not.

12. The image reading device according to claim 4, further comprising:
a second screen display unit that configured to display a second screen on the display unit after the scan process; and
a second screen display setting unit configured to set whether to display the second screen or not.

13. The image reading device according to claim 5, further comprising:
a second screen display unit configured to display a second screen on the display unit after the scan process; and
a second screen display setting unit configured to set whether to display the second screen or not.

14. The image reading device according to claim 6, further comprising:
a second screen display unit configured to display a second screen on the display unit after the scan process; and
a second screen display setting unit configured to set whether to display the second screen or not.

15. The image reading device according to claim 7, further comprising:
a second screen display unit configured to display a second screen on the display unit after the scan process; and
a second screen display setting unit configured to set whether to display the second screen or not.

16. The image reading device according to claim 8, further comprising:
a second screen display unit configured to display a second screen on the display unit after the scan process; and
a second screen display setting unit configured to set whether to display the second screen or not.

17. The image reading device according to claim 1, further comprising:
a transmission source setting unit configured to set a transmission source of the start instruction,
wherein the start instruction receiving unit is configured to receive only the start instruction from the transmission source set by the transmission source setting unit.

18. The image reading device according to claim 2, further comprising:
a transmission source setting unit configured to set a transmission source of the start instruction,
wherein the start instruction receiving unit is configured to receive only the start instruction from the transmission source set by the transmission source setting unit.

19. The image reading device according to claim 3, further comprising:
a transmission source setting unit configured to set a transmission source of the start instruction,
wherein the start instruction receiving unit is configured to receive only the start instruction from the transmission source set by the transmission source setting unit.

20. A non-transitory computer readable medium storing an image reading control program that causes an image reading device including a reading unit that reads image data of a document placed on a platen, a communication unit that communicates with an external apparatus, an input unit that receives a user instruction from a user located at the input unit, a start unit that receives a start instruction transmitted from the outside through the communication unit and starts the reading unit, and a display unit that displays a screen to function as:
a first screen display unit that displays a first screen in response to receiving the user instruction, wherein the first screen is displayed while waiting for the start instruction;
an inhibition unit that inhibits an operation other than a scan process initiated according to the start instruction, while the first screen is displayed; and
wherein the start unit receives the start instruction while the display unit displays the first screen.

21. The image reading device according to claim 1, wherein the input unit comprises a touch panel.

22. The image reading device according to claim 1, wherein the input unit comprises a display.

23. The image reading device according to claim 1, wherein the input unit comprises operation buttons.

24. The image reading device according to claim 1, wherein the display unit is further configured to display a document removal confirmation screen after the reading unit reads the image data.

25. The image reading device according to claim 1, wherein the user instruction comprises an instruction to display a pull scan standby screen.

26. The image reading device according to claim 1, wherein the start instruction is initiated by the user, after the user has moved away from the input unit, and when the user is located at the external apparatus.

* * * * *